United States Patent [19]

Kim

[11] Patent Number: 4,989,966
[45] Date of Patent: Feb. 5, 1991

[54] ADJUSTABLE VEHICLE SIDE VIEW MIRROR

[76] Inventor: Hyun G. Kim, 115-295, Mun Won-dong, GWA Chun, Kyungki-do, Rep. of Korea

[21] Appl. No.: 490,060

[22] Filed: Mar. 7, 1990

[30] Foreign Application Priority Data

Apr. 29, 1989 [KR] Rep. of Korea ............... 5485/89

[51] Int. Cl.⁵ ............................ G02B 7/18; B60R 1/06
[52] U.S. Cl. ................................ 350/632; 248/476; 248/479
[58] Field of Search ............... 350/600, 632, 606, 631; 248/476, 477, 479, 481

[56] References Cited

U.S. PATENT DOCUMENTS

| | | | |
|---|---|---|---|
| 1,879,592 | 9/1932 | Thomas | 350/632 |
| 3,421,728 | 1/1969 | Gordon | 248/477 |
| 3,439,646 | 4/1969 | Helle | 350/632 |
| 3,513,807 | 5/1970 | Helle | 350/632 |
| 4,526,446 | 7/1985 | Adams | 350/632 |

FOREIGN PATENT DOCUMENTS 0011537 1/1977 Japan ............................ 350/632

Primary Examiner—Bruce Y. Arnold
Assistant Examiner—R. D. Shafer
Attorney, Agent, or Firm—Limbach, Limbach & Sutton

[57] ABSTRACT

An adjustable side view mirror for use with a vehicle is disclosed. The side view mirror comprises a mirror having a periphery with a flexible member having a first end and a second end with the flexible member being in contact with a portion of the periphery of the mirror. A frame having an opening receives the mirror together with the flexible member in contact with a portion of the periphery of the mirror. An adjusting means is positioned on the frame for adjusting the distance separating the first and the second ends of the flexible member to thereby increase the distance separating the first and the second ends of the flexible member thereby decreasing the tension of the flexible member on the mirror to enable the mirror to be moved to a desired position and to thereby decrease the distance separating the first and the second ends of the flexible member to thereby increasing the tension of the flexible member on the mirror to stabilize the mirror against further movement.

3 Claims, 2 Drawing Sheets

ADJUSTABLE VEHICLE SIDE VIEW MIRROR

BACKGROUND OF THE INVENTION

Field of the Invention

The present invention relates to a vehicle side view mirror, particularly to a device for correcting and fixing the position of the vehicle side view mirror which is constructed in such a way that the side view mirror can be fixed by providing a flexible member along the entire side of the side view mirror in the space between the case and the side view mirror so that the side view mirror does not move in the case even when it is given an impact, and that the angle of the side view mirror can be easily adjusted by a driver.

The angle of the presently used vehicle side view mirror must be adjusted frequently according to the driver's physical structure, the state of the driver's seat and exterior impact. For a driver to adjust the angle of the side view mirror, he has to correct the angle of the side view mirror first, then he has to check the reflected image while seated in the driver's seat, and then he has to repeat the action of correcting the angle of the side view mirror. Furthermore, because the angle of the side view mirror is adapt to be changed due to a slight impact, the exact reflected image must be duplicated by repeating the above procedure until the desired image is attained. Also, the angle of the side view mirror may need adjustment after cleaning the exterior of the vehicle or after an impact to the mirror or the supporting structure thereof.

A device for remote adjustment of the side view mirror is expensive making it uneconomical to install the mirror to the medium or small vehicles. Furthermore, there are disadvantages in the remote adjusting devices of the prior art (manual or automatic) since those devices require installation from the mounting position through the vehicle body and into the vehicle cab, which is a multi step and costly process. Also, repairing such devices is costly due to their complicated design. Another problem with this type of remote adjusting device is that the driver is tempted to correct the reflected image or view of the mirror while driving.

An object of the present invention is to provide a mirror device for easily correcting and securing the position of the vehicle side view mirror such that the reflected image of the side view mirror can be easily adjusted to the desired position, and once corrected is securely maintained in the adjusted state.

A further object of the present invention is to provide a mirror device which includes position correction lines positioned about the periphery of the mirror to enable easy readjustment of the mirror by providing the approximate position of the mirror relative to the correction lines prior to misalignment of the mirror such that the mirror can be so positioned thereby shorting the adjustment process.

SUMMARY OF THE INVENTION

This invention is defined by the appended claims with a specific embodiment illustrated in the attached drawings. For the purpose of summarizing the invention, the invention may be incorporated into an adjustable side view mirror for use with a vehicle. The mirror comprises a mirror having a periphery and a flexible member in contact with a portion of the periphery of the mirror. The flexible member has a first end and a second end. A frame having an opening receives the mirror and the flexible member in contact with a portion of the periphery of the mirror. An adjusting means is positioned on the frame for adjusting the distance separating the first and the second ends of the flexible member such that in use the mirror may be adjusted by manipulating the adjusting means to increase the distance separating the first and the second ends of the flexible member thereby decreasing the tension of the flexible member on the mirror to enable the mirror to be moved to a desired position and securing the mirror by manipulating the adjusting means to decrease the distance separating the first and the second ends of the flexible member to thereby increasing the tension of the flexible member on the mirror to stabilize the mirror against further movement.

The mirror preferably including a mirror securing means to pivotally secure mirror to the frame to enable pivotal adjustment of the mirror relative to the frame.

DETAILED DESCRIPTION OF THE DRAWINGS

A detailed description with reference to the attached drawings is given below.

Figure 1:
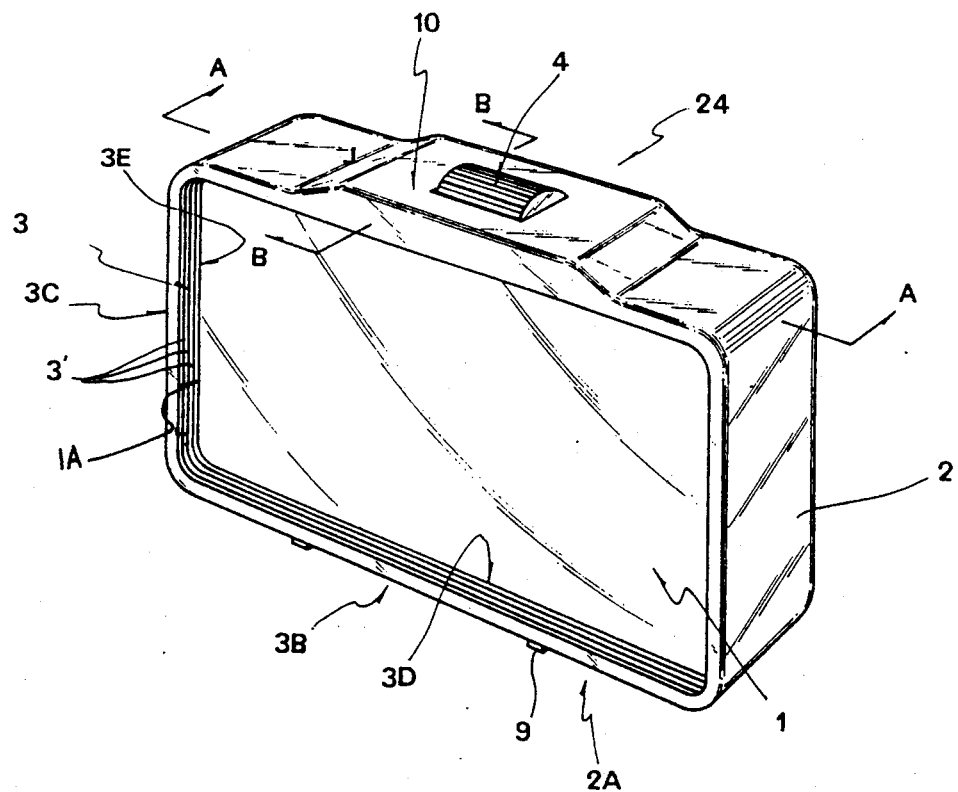
FIG. 1 is a perspective view of the side view mirror and the frame according to the present invention.

FIG. 1 is a perspective view of the vehicle side view mirror according to the present invention and includes a mirror 1 having a periphery 3D with a flexible member 3 in contact with a portion 3E of the periphery 3D of the mirror 1. The flexible member 3 includes a first end 3A and a second end 3B. A frame 2 having an opening 2A receives the mirror 1 and the flexible member 3 in contact with a portion 3E of the periphery 3D of the mirror 1. An adjusting means 24 is positioned on the frame 2 for adjusting the distance separating the first 3A and the second 3B ends of the flexible member 3. Preferably, the adjusting means 24 is the driving member 4. A mirror securing means 26 pivotally secures the mirror 1 to the frame 2.

A housing 10 of the predetermined length and height is provided on frame 2 to receive the adjusting means 24. The adjusting means 24 preferably includes the driving member 4 with opposed screw sections 4' and followers 5 secured to the first and second ends of the flexible member 3. Between the interior surface of the frame 2 and the periphery 1A of the side view mirror 1 a flexible member 3 such as rubber is positioned. On the surface 3C of the flexible member 3 a plurality of contrasting colored or numbered position correction lines 3' may be formed to aid in readjusting the mirror, should such readjustment become necessary.

The flexible member 3 is in close contact with the interior surface of the frame 2. On the bottom of the frame 2 is provided a fixing screw 9 for securing the bottom portion 3B of flexible member 3 to the frame, and on the top of the frame is provided a driving member 4, described below, to secure both ends of the flexible member 3. In this manner the flexible member 3 installed along the interior surface of the frame 2 is prevented from moving out of frame 2.

When the side view mirror 1 is moved, the angle of the side view mirror 1 can be easily corrected by bringing periphery of the side view mirror 1 to the number of color of the position correcting line 3' which the mirror was previously positioned prior to movement.

Figure 2:
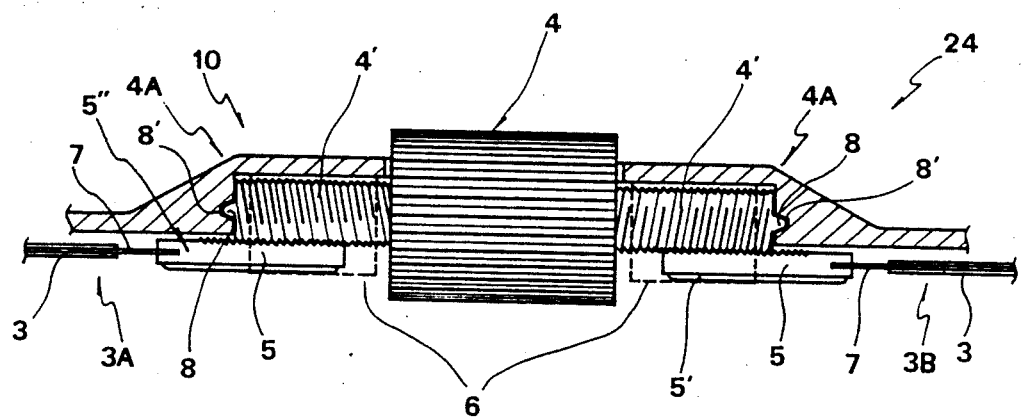
FIG. 2 is a partially enlarged sectional view along the line A—A of FIG. 1.

FIG. 2 is a partial sectional view taken along the line A—A of FIG. 1, showing the first and the second ends of the flexible member 3.

The driving member 4 and the flexible member 3 with the resilient members 7, are received into the housing formed between the frame 2 and the side view mirror 1.

Thus, positioned in the housing 10 of the frame 2, is the driving member 4. Preferably, the driving member 4 is cylindrical with each end of the cylinder including cylindrical driving screws 4' each of which are of a predetermined length. The threads formed on each driving screw 4' of the driving member 4 are opposite relative to each other in order that upon rotation of the driving member each follower 5 moves toward or away from each other as determined by the direction of rotation of the driving member.

A supporting nipple 8 is provided on each end 4A of the cylindrical driving screws 4'. Each supporting nipple is received into a recess 8' which is formed on the surface of the frame 2 corresponding to the supporting nipple 8, so that the driving member 4 rotates about the supporting nipple 8.

Each driving screw 4' is in operative contact with the flat follower member 5 so that each follower member 5 moves in relation to the movement, i.e., rotation, of the driving screw 4'. When the driving member 4 rotates, each flat follower member 5 moves along an axial direction but in opposite directions relative to each other.

In the portion of the frame where the driving screw 4' and the follower members 5 contact with each other, a supporting member 6 supports the driving screw section 4' and follower 5 which are in operative contact with each other. Supporting member 6 is fixed to the top 2' of the frame 2. On the portion of the follower member 5 abutting the inner surface 6' of the supporting member 6, a protrusion 5' is provided on the portion of follower member 5 which is in contact with the inner surface 6' of the supporting member 6 so that the surface friction force between the supporting member 6 and the follower member 5 may be reduced.

The outer end 5" of the follower member 5 is secured to the resilient member 7 which is secured to the flexible member 3.

Now, the function and operation of the present invention is described with reference to FIGS. 1 and 2.

Figure 4:
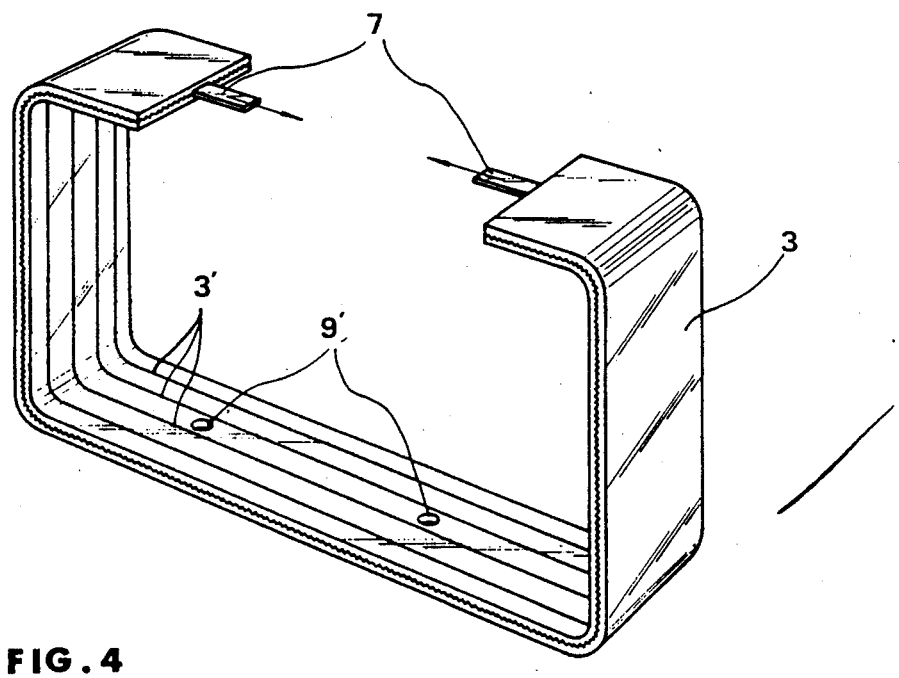
FIG. 4 is a perspective view of the flexible member used in the present invention.

Flexible member 3 is inserted in the space between the frame 2 and the mirror 1, with the ends 3A, 3B of the flexible member 3 secured to the respective ends of the follower members 5, as illustrated at FIG. 4.

Thus, if the driver adjusts the position of the side view mirror in accordance with the position correcting lines 3' and rotates driving member 4 thereby rotating the driving screws and, because the screw threads formed on each of the driving screws 4' are turned opposite relative to each other, each follower member 5 moves toward the driving member 4 thereby tensioning each resilient member 7 fixed to the follower member 5 and eventually the side view mirror 1 is fixed or secured.

Figure 3:
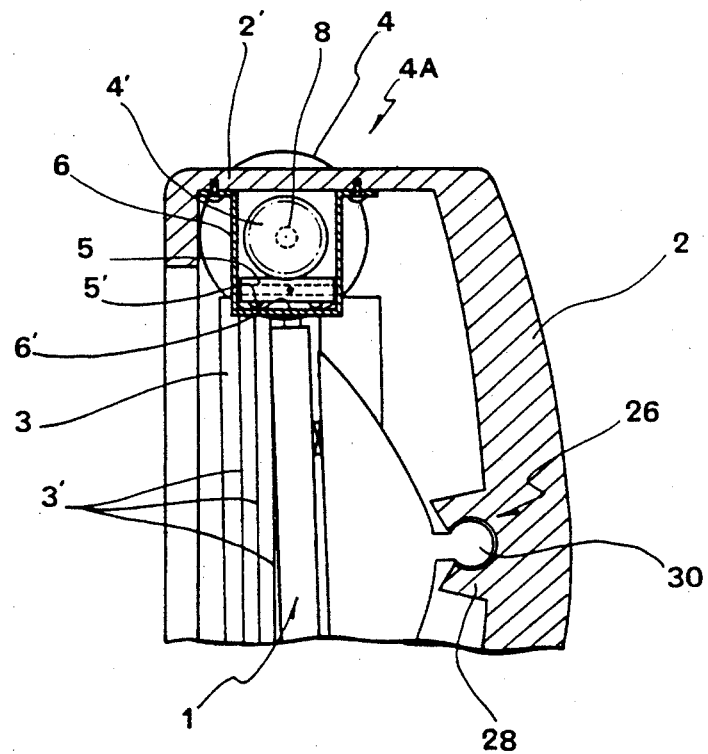
FIG. 3 is a partial sectional view taken alone line B—B of FIG. 1.

FIG. 3 is a partial side view of FIG. 2 to further illustrate the construction of the mirror according to the present invention including the construction of the supporting member 6 described above and the mirror securing means 26 which pivotally secures the mirror 1 to the frame 2 to enable pivotal adjustment of the mirror relative to the frame. Preferably, the mirror securing means 26 is a ball 30 which is received into a socket 28.

To ensure that the driving screws 4' and the follower member 5 are in operative contact to enable axial movement of the follower members 5 upon rotation of the driving member 4, the supporting members 6 are respectively positioned along the bottom of the follower member 5 and are secured to the frame 2'. The supporting members 6 force the follower 5 against the threads of the driving screws. To minimize surface friction between the moving follower member 5 and the stationary supporting member 6, protrusions 5' are formed on the bottom of the follower member 5.

In the present invention as described above, both sides of the side view mirror 1 are acted upon at the same time by rotation of the driving member 4 so that the position of the side view mirror 1 may be easily changed or secured depending on the direction of the rotation of the driving member 4.

Once the mirror has been adjusted, by utilizing the principle of the present invention the side view mirror 1 can be secured without changing the adjustment since the driving member 4 evenly tensions the flexible member 3.

If the driver wants to change the angle of the side view mirror 1, the position of the side view mirror 1 can be changed with ease because the mirror 1 can be easily loosened by turning the driving member 4 in the opposite direction to that for securing the mirror. It is to be noted here that to prevent snow or rain from entering in the inside of the side view mirror 1, a cover or the like may be installed to shield the top of the housing 10 in which the driving member 4 is formed.

The position of the adjusting means 24 may be positioned on either side of or the bottom the frame 2 according to the position which best corresponds to the kind of the vehicle upon which the mirror will be used.

FIG. 4 is a perspective view of the flexible member 3 in which the position correction lines 3' described in FIG. 1 is shown. The thickness of the flexible member 3 shall be such as not to interfere the movement of the side view mirror. The resilient member 7 in the form of the thin plate is installed in the flexible member 3 and both ends of the resilient member 7 are connected to the respective follower member 5 to perform the function of securing the mirror against movement or releasing the mirror to enable adjusting movement of the side view mirror 1. Apertures 9' are formed through the flexible member 3 in order that fixing screws 9 may be received therethrough and secure the flexible member 3 to the frame 2.

Further, the width of the flexible member 3 shall be such as to fully encompass the side view mirror 1 when the side of the side view mirror 1 moves forward, aft, left and right (for example, within 5 Cm). The position correcting lines 3' provided along the width of the surface of the flexible member are formed in the form of rims spaced apart at a constant interval, and numbers may be assigned on each position correcting line. Various colors of the rim may be also used to enhance the appearance of the device as well as indicating the desired adjusted position of the mirror.

The present invention as described above has the effect that the angle of the side view mirror can be corrected with ease to the positions established in the frame, and that the established position of the side view mirror can be fixed with ease.

It is important to note that the mounting means for securing the mirror device to the vehicle are well known. For sake of brevity, such mounting means are not otherwise disclosed as their design and function are well known to those skilled in the art.

The technical gist of the present invention is not limited to the attached drawings and the descriptions of the drawings, and various alterations are possible without changing the technical gist and the characteristics of the present invention.

What is claimed is:

1. An adjustable side view mirror for use with a vehicle, said mirror comprising:
    a mirror having a periphery;
    a flexible member in contact with a portion of said periphery of said mirror and having a first end and a second end;
    a frame having an opening to receive said mirror and said flexible member in contact with a portion of said periphery of said mirror; and
    an adjusting means positioned on said frame for adjusting the distance separating said first and said second ends of said flexible member such that in use said mirror is adjusted by manipulating said adjusting means to increase the distance separating said first and said second ends of said flexible member thereby decreasing the tension of the flexible member on said mirror to enable said mirror to be moved to a desired position and securing said mirror by manipulating said adjusting means to decrease the distance separating said first and said second ends of said flexible member to thereby increasing the tension of the flexible member on said mirror to stabilize said mirror against further movement.

2. The mirror of claim 1 further including a mirror securing means to pivotally secure said mirror to said frame to enable pivotal adjustment of said mirror relative to said frame.

3. The flexible member of claim 1 further including a plurality of equally spaced relative to one another position correction lines 3' formed on said flexible member.

* * * * *